(12) United States Patent
Floyd

(10) Patent No.: US 11,312,193 B2
(45) Date of Patent: Apr. 26, 2022

(54) ADJUSTABLE TRAILER HITCH

(71) Applicant: Jason Floyd, Wilmington, NC (US)

(72) Inventor: Jason Floyd, Wilmington, NC (US)

( * ) Notice: Subject to any disclaimer, the term of this patent is extended or adjusted under 35 U.S.C. 154(b) by 144 days.

(21) Appl. No.: 16/812,826

(22) Filed: Mar. 9, 2020

(65) Prior Publication Data

US 2021/0276380 A1  Sep. 9, 2021

(51) Int. Cl.
*B60D 1/42* (2006.01)
*B60D 1/58* (2006.01)
*B60D 1/06* (2006.01)

(52) U.S. Cl.
CPC ............... *B60D 1/42* (2013.01); *B60D 1/06* (2013.01); *B60D 1/58* (2013.01)

(58) Field of Classification Search
CPC ............... B60D 1/42; B60D 1/06; B60D 1/58
See application file for complete search history.

(56) References Cited

U.S. PATENT DOCUMENTS

| | | | | |
|---|---|---|---|---|
| 5,395,131 A | * | 3/1995 | Herrick | B60D 1/06 280/507 |
| 5,871,222 A | * | 2/1999 | Webb | B60D 1/52 280/511 |
| 6,173,985 B1 | * | 1/2001 | Thomas | B60D 1/06 280/491.1 |
| 6,419,258 B1 | * | 7/2002 | Grote | B60D 1/06 280/507 |
| 9,957,989 B2 | * | 5/2018 | Schevers | F16B 5/0614 |
| 2004/0164518 A1 | * | 8/2004 | Staggs | B60D 1/28 280/507 |
| 2009/0267323 A1 | * | 10/2009 | Belinky | B60D 1/06 280/511 |
| 2017/0326930 A1 | * | 11/2017 | Huff | B60D 1/60 |

* cited by examiner

*Primary Examiner* — Minnah L Seoh
*Assistant Examiner* — Marlon A Arce
(74) *Attorney, Agent, or Firm* — The Iwashko Law Firm, PLLC; Lev Ivan Gabriel Iwashko

(57) ABSTRACT

An adjustable trailer hitch disposed on a ball mount, the adjustable trailer hitch including a trailer ball to receive a trailer coupler thereupon, a plurality of elongated members disposed on and within at least a portion of the trailer ball to move from retracted in a first position to at least partially extended in a second position, and an adjustment assembly disposed on and within at least a portion of the trailer ball to move the plurality of elongated members in response to a rotation of the adjustment assembly.

3 Claims, 2 Drawing Sheets

ADJUSTABLE TRAILER HITCH

BACKGROUND

1. Field

The present general inventive concept relates generally to a trailer hitch, and particularly, to an adjustable trailer hitch.

2. Description of the Related Art

A trailer hitch is a crucial attachment device to connect a trailer to a vehicle. Unfortunately, the trailer hitch is often rigid in design and requires specific parts to complement specific trailers. The necessity to match parts to the trailer means that users have to change the trailer hitch every time they change the trailer. Moreover, users have to track various parts and invest time to properly set up the trailer hitch, which can be highly frustrating.

Furthermore, the need for so many parts results in more complications because it increases the likelihood that another part will not work.

Therefore, there is a need for an adjustable trailer hitch to fit any trailer.

SUMMARY

The present general inventive concept provides an adjustable trailer hitch.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an adjustable trailer hitch disposed on a ball mount, the adjustable trailer hitch including a trailer ball to receive a trailer coupler thereupon, a plurality of elongated members disposed on and within at least a portion of the trailer ball to move from retracted in a first position to at least partially extended in a second position, and an adjustment assembly disposed on and within at least a portion of the trailer ball to move the plurality of elongated members in response to a rotation of the adjustment assembly.

The adjustment assembly may include a rod disposed at a first end within the trailer ball, and a knob disposed on a second end of the rod to facilitate gripping thereof.

The rod may include a plurality of locking grooves springingly disposed on and within at least a portion of the rod to prevent the rod from moving away from the trailer ball.

Each of the plurality of locking grooves may have a beveled portion on a first side and is planar on a second side.

The adjustment assembly may further include a button disposed on at least a portion of the knob to retract the plurality of locking grooves in response to being depressed.

The adjustable trailer hitch may further include a locking nut circumferentially disposed around at least a portion of the adjustment assembly to prevent movement of the adjustment assembly in a locked position, and allow movement of the adjustment assembly in an unlocked position.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Adjustable Trailer Hitch 100
Trailer Ball 110
Gears 111
Elongated Members 120
Adjustment Assembly 130
Rod 131
Locking Grooves 131*a*
Knob 132
Button 133
Locking Nut 140

Figure 1A:
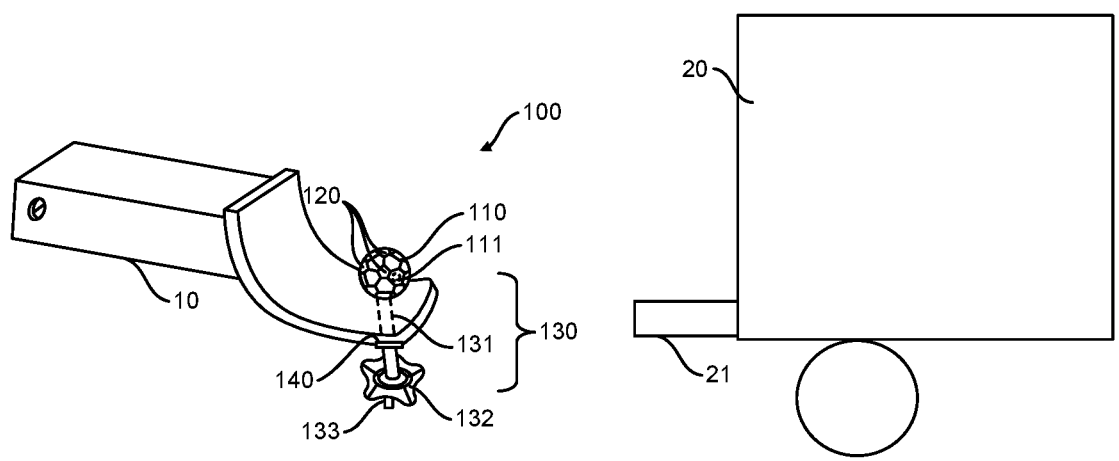
FIG. 1A illustrates a top isometric view of an adjustable trailer hitch in a retracted position, according to an exemplary embodiment of the present general inventive concept.

FIG. 1A illustrates a top isometric view of an adjustable trailer hitch 100 in a retracted position, according to an exemplary embodiment of the present general inventive concept.

Figure 1B:
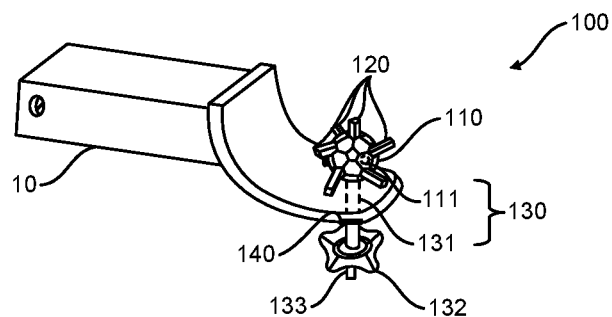
FIG. 1B illustrates a top isometric view of the adjustable trailer hitch in an extended position, according to an exemplary embodiment of the present general inventive concept.

FIG. 1B illustrates a top isometric view of the adjustable trailer hitch 100 in an extended position, according to an exemplary embodiment of the present general inventive concept.

The adjustable trailer hitch 100 may be constructed from at least one of metal, plastic, ceramic, and rubber, etc., but is not limited thereto. For example, the adjustable trailer hitch 100 may constructed of a high quality metal and/or stainless steel.

Additionally, the adjustable trailer hitch 100 may be disposed on a ball mount 10.

The adjustable trailer hitch 100 may include a trailer ball 110, a plurality of elongated members 120, an adjustment assembly 130, and a locking nut 140, but is not limited thereto.

Referring to FIGS. 1A and 1B, the trailer ball 110 is illustrated to have a spherical shape. However, the trailer ball 110 may be a rectangular prism, conical, pentagonal, hexagonal, octagonal, or any other shape known to one of ordinary skill in the art, but is not limited thereto.

The trailer ball 110 may include a plurality of gears 111, but is not limited thereto.

The plurality of gears 111 may be disposed within at least a portion of an interior of the trailer ball 110.

The trailer ball 110 may receive a trailer coupler 21 of a trailer 20 thereupon.

The plurality of elongated members 120 may be disposed on and/or within at least a portion of the trailer ball 110. More specifically, each of the plurality of elongated members 120 may be disposed at a predetermined distance from each other on and/or within the trailer ball 110.

Figure 2:
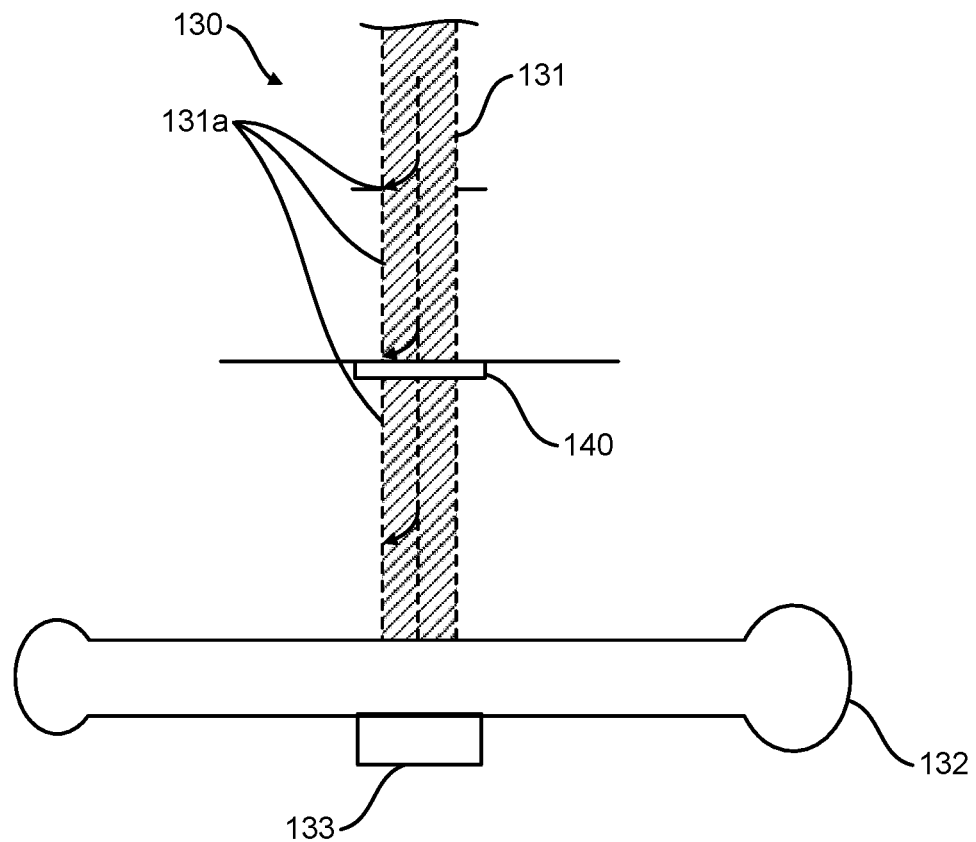
FIG. 2 illustrates a side view of an adjustment assembly, according to an exemplary embodiment of the present general inventive concept.

FIG. 2 illustrates a side view of an adjustment assembly 130, according to an exemplary embodiment of the present general inventive concept.

The adjustment assembly 130 may include a rod 131, a knob 132, and a button 133, but is not limited thereto.

Referring to FIGS. 1A through 2, the rod 131 may be disposed at a first end on and/or within at least a portion of the trailer ball 110, such that the rod 131 may be disposed through at least a portion of the ball mount 10.

The rod 131 may include a plurality of locking grooves 131*a*, but is not limited thereto.

The knob 132 may be disposed on a second end of the rod 131. The knob 132 may facilitate gripping thereof.

Additionally, the rod 131 may rotate in a first direction (i.e. clockwise) or a second direction (i.e. counterclockwise) in response to a rotation of the knob 132, such that the rod 131 moves at least partially toward and/or within a center portion of the trailer ball 110. Alternatively, the rod 131 may rotate in the second direction or the first direction in response to a rotation of the knob 132, such that the rod moves at least partially away and/or out from the center portion of the trailer ball 110. Furthermore, a length of the rod 131 may be equivalent and/or less than a diameter of the trailer ball 110.

The plurality of elongated members 120 may move from a first position (i.e. retracted) to at least partially toward a second position (i.e. extended) in response to movement of the rod 131 toward and/or within the center portion of the trailer ball 110. Alternatively, the plurality of elongated members 120 may move from the second position to at least partially toward the first position in response to movement of the rod 131 away and/or out from the center portion of the trailer ball 110.

Moreover, the rod 131 may rotate the plurality of gears 111. Each of the plurality of gears 111 is connected to at least one of the plurality of elongated members 120. As such, the rotation of the plurality of gears 111 may retract and/or extend the plurality of elongated members 120 based on the rotation of the rod 131 via the knob 132.

Furthermore, the plurality of elongated members 120 may collectively form a spherical shape similar to the trailer ball 110 in the extended position, such that the plurality of elongated members 120 may receive the trailer coupler 21 thereupon. Also, each of the plurality of elongated members 120 may have a strong magnet on an end connected to the trailer coupler 21 to prevent the trailer coupler 21 from moving away and/or falling off the plurality of elongated members 120.

The plurality of locking grooves 131*a* may be springingly disposed on and/or within at least a portion of the rod 131. The plurality of locking grooves 131*a* may retract in response to contacting a surface of the ball mount 10 due to each of the plurality of locking grooves 131*a* having a beveled portion on a first side of each of the plurality of locking grooves 131*a*. As such, the surface of the ball mount 10 may contact the beveled portion to push the plurality of locking grooves 131*a* toward and/or within the rod 131.

Moreover, the plurality of locking grooves 131*a* may extend to an original position in response to the rod 131 passing through the ball mount 10 and into the trailer ball 110 due to a spring force on each of the plurality of locking grooves 131*a*.

Conversely, the plurality of locking grooves 131*a* may be planar on a second side opposite with respect to the beveled portion on the first side, such that the rod 131 may not be extracted from the trailer ball 110. In other words, the plurality of locking grooves 131*a* may prevent the rod 131 from moving out from the trailer ball 110.

The button 133 may be disposed on at least a portion of the knob 132. The button 133 may be depressed to retract the plurality of locking grooves 131*a*, such that the rod 131 may be extracted from the trailer ball 110. Alternatively, the button 133 may be released to allow the plurality of locking grooves 131*a* to resume normal functioning.

The locking nut 140 may be circumferentially disposed around at least a portion of the rod 131. The locking nut 140 may be rotated in the first direction or the second direction to prevent rotation of the rod 131 in any direction while in a locked position. Alternatively, the locking nut 140 may be rotated in the second direction or the first direction to allow rotation of the rod 131 in an unlocked position.

Therefore, adjustable trailer hitch 100 may provide flexibility to attach trailers without requiring multiple parts that need to be removed and/or replaced. As such, the adjustable trailer hitch 100 may be an economically attractive option to connecting trailers.

The present general inventive concept may include an adjustable trailer hitch 100 disposed on a ball mount 10, the adjustable trailer hitch 100 including a trailer ball 110 to receive a trailer coupler 21 thereupon, a plurality of elongated members 120 disposed on and within at least a portion of the trailer ball 110 to move from retracted in a first position to at least partially extended in a second position, and an adjustment assembly 130 disposed on and within at least a portion of the trailer ball 110 to move the plurality of elongated members 120 in response to a rotation of the adjustment assembly 130.

The adjustment assembly 130 may include a rod 131 disposed at a first end within the trailer ball 131, and a knob 132 disposed on a second end of the rod 131 to facilitate gripping thereof.

The rod 131 may include a plurality of locking grooves 131a springingly disposed on and within at least a portion of the rod 131 to prevent the rod 131 from moving away from the trailer ball 110.

Each of the plurality of locking grooves 131a may have a beveled portion on a first side and is planar on a second side.

The adjustment assembly 130 may further include a button 133 disposed on at least a portion of the knob 132 to retract the plurality of locking grooves 131a in response to being depressed.

The adjustable trailer hitch 100 may further include a locking nut 140 circumferentially disposed around at least a portion of the adjustment assembly 130 to prevent movement of the adjustment assembly 130 in a locked position, and allow movement of the adjustment assembly 130 in an unlocked position.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An adjustable trailer hitch disposed on a ball mount, the adjustable trailer hitch comprising:

a trailer ball to receive a trailer coupler thereupon;

a plurality of elongated members disposed on and within at least a portion of the trailer ball to move from retracted in a first position to at least partially extended in a second position; and an adjustment assembly disposed on and within at least a portion of the trailer ball to move the plurality of elongated members in response to a rotation of the adjustment assembly, the adjustment assembly comprising:

a rod disposed at a first end within the trailer ball, the rod comprising:

a plurality of locking grooves springingly disposed on and within at least a portion of the rod to prevent the rod from moving away from the trailer ball, such that each of the plurality of locking grooves has a beveled portion on a first side and is planar on a second side, and a knob disposed on a second end of the rod to facilitate gripping thereof.

2. The adjustable trailer hitch of claim 1, wherein the adjustment assembly further comprises:

a button disposed on at least a portion of the knob to retract the plurality of locking grooves in response to being depressed.

3. The adjustable trailer hitch of claim 1, further comprising:

a locking nut circumferentially disposed around at least a portion of the adjustment assembly to prevent movement of the adjustment assembly in a locked position, and allow movement of the adjustment assembly in an unlocked position.

\* \* \* \* \*